United States Patent
Matscheko et al.

(10) Patent No.: US 7,863,782 B2
(45) Date of Patent: Jan. 4, 2011

(54) LINEAR MOTOR WITH DIFFERENTLY CONFIGURED SECONDARY PART SECTIONS

(75) Inventors: Gerhard Matscheko, Starnberg (DE); Gernot Rossi, Simmelsdorf (DE); Hubert Schedler, Karlsfeld (DE); Johannes Wollenberg, Gräfelfing (DE)

(73) Assignee: Siemens Aktiengesellschaft, München (DE)

( * ) Notice: Subject to any disclaimer, the term of this patent is extended or adjusted under 35 U.S.C. 154(b) by 263 days.

(21) Appl. No.: 12/295,066

(22) PCT Filed: Feb. 16, 2007

(86) PCT No.: PCT/EP2007/051523

§ 371 (c)(1),
(2), (4) Date: Sep. 29, 2008

(87) PCT Pub. No.: WO2007/113044

PCT Pub. Date: Oct. 11, 2007

(65) Prior Publication Data

US 2009/0189465 A1     Jul. 30, 2009

(30) Foreign Application Priority Data

Mar. 29, 2006  (DE)  .............. 10 2006 014 616

(51) Int. Cl.
*H02K 41/03* (2006.01)

(52) U.S. Cl. ............ 310/12.18; 310/12.25; 310/12.26

(58) Field of Classification Search .......... 310/12.18, 310/12.15, 12.22, 12.25, 12.26

See application file for complete search history.

(56) References Cited

U.S. PATENT DOCUMENTS

| | | | |
|---|---|---|---|
| 4,563,602 A * | 1/1986 | Nagasaka | ............... 310/12.22 |
| 5,208,496 A | 5/1993 | Dantsker et al. | |
| 5,959,373 A | 9/1999 | Cho | |

(Continued)

FOREIGN PATENT DOCUMENTS

DE     2116723 A     4/1971

(Continued)

OTHER PUBLICATIONS

"A Novel High-Torque Reluctance Motor with Rare-Earth Magnet" IEEE Transactions on Industry Applications, IEEE Service Center, Piscataway, NJ, US; vol. 30, Issue 3, May 1, 1994, pp. 609-613, XP000459019, ISSN: 0093-9994; Magazine.

*Primary Examiner*—Quyen Leung
*Assistant Examiner*—Leda Pham
(74) *Attorney, Agent, or Firm*—Henry M. Feiereisen; Ursula B. Day

(57) ABSTRACT

The aim of the invention is to better adapt the power range of a linear motor to specific applications. For this purpose, the secondary part (2) is subdivided into at least one first (3) and one second section (4) in the direction of travel (15) of the primary part (1). The secondary part (2), in the first section (3), has a different shape than in the second section (4) and/or is produced from a different material. In this manner, different speeds of the primary part (1) can be achieved on the traveled distance independent of the actuation of the primary part. Optionally, cage windings can be inserted in a section of the secondary part so that said secondary part can be used for passive breaking.

10 Claims, 2 Drawing Sheets

U.S. PATENT DOCUMENTS

| | | | |
|---|---|---|---|
| 7,057,312 B2 * | 6/2006 | Hodzic et al. | 310/12.01 |
| 2002/0050743 A1 | 5/2002 | Joong et al. | |
| 2007/0194632 A1 * | 8/2007 | Yura et al. | 310/12 |
| 2008/0111430 A1 * | 5/2008 | Jenny | 310/12 |
| 2008/0136268 A1 * | 6/2008 | Lachat et al. | 310/12 |

FOREIGN PATENT DOCUMENTS

| | | |
|---|---|---|
| DE | 69115918 T2 | 7/1996 |
| DE | 73 13 074 U1 | 11/1999 |
| DE | 10 2004 008 688 A1 | 9/2005 |
| DE | 10 2004 012 287 A1 | 9/2005 |
| DE | 10 2004 045 992 A | 4/2006 |
| GB | 2057778 A | 4/1981 |
| JP | 55147968 A | 11/1980 |
| JP | 56107774 A | 8/1981 |
| JP | 59162760 A | 9/1984 |
| JP | 63039456 A * | 2/1988 |
| JP | 02074145 A | 3/1990 |
| JP | 11332210 A | 11/1999 |
| JP | 2001/1112119 A | 4/2001 |

* cited by examiner

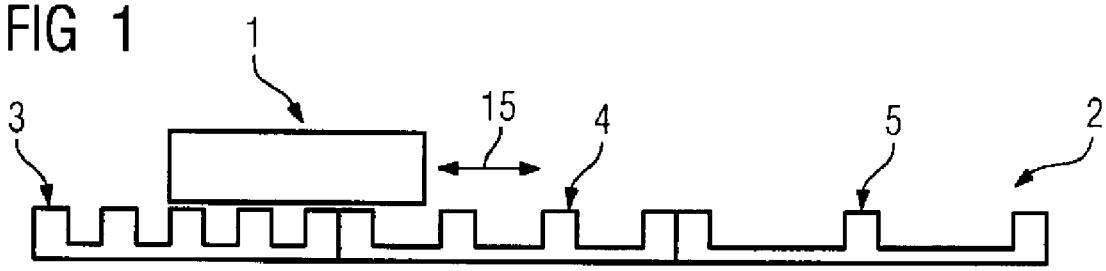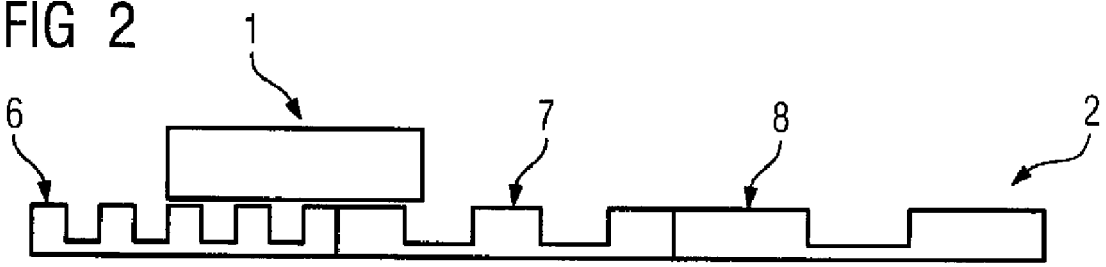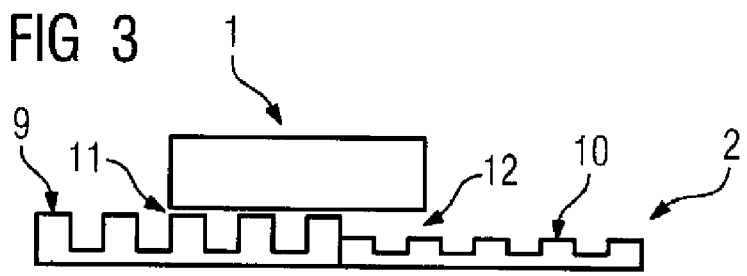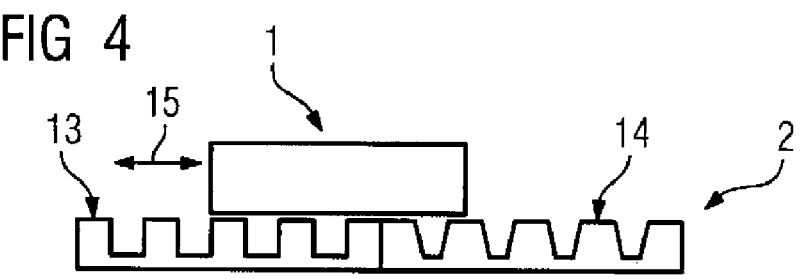

LINEAR MOTOR WITH DIFFERENTLY CONFIGURED SECONDARY PART SECTIONS

BACKGROUND OF THE INVENTION

The present invention relates to a linear motor with a primary part and a secondary part, which is operatively connected magnetically to the primary part which is capable of being moved over said secondary part.

Linear motors are used for a large number of different applications. With each application, the requirements placed on the linear motor are generally very specific. Thus consideration is taken of the fact that the power field of the linear motor is adapted correspondingly. The power field of the motor is in this case a product of the force or torque and velocity or rotation speed. This product depends on numerous parameters such as air gap, tooth width, slot width etc. This applies in particular also to synchronous motors with excitation on the primary side. The matching of the power takes place, for example, by means of pole-changing in mains-fed motors.

The braking of the linear motor also has to take place with a brake which is suitable for the respective application. For example, active braking in electrical or mechanical fashion may be favorable for one or the other application. For example, active short-circuit braking can be used. Passive braking may be more advantageous for other applications. Usually, the type of brake should be matched directly to the drive.

SUMMARY OF THE INVENTION

The object of the present invention consists in being able to match the power of a linear motor in a simple manner to the respective requirement.

According to the invention, this object is achieved by a linear motor with a primary part and a secondary part, which is operatively connected magnetically to the primary part which is capable of being moved over said secondary part, wherein the secondary part is split at least into a first section and a second section in the movement direction of the primary part, and the secondary part has a different shape and/or is formed from a different material in the first section in comparison with the second section.

In accordance with a first configuration, the power matching can take place by virtue of the fact that slot widths between pole teeth in the first section differ from slot widths between pole teeth in the second section. In a similar way to this, the tooth widths can also be varied, wherein tooth widths of pole teeth in the first section differ from tooth widths of pole teeth in the second section. By varying the slot and tooth width, for example, the velocity of the linear motor can be altered.

In a further configuration of the linear motor according to the invention, the air gap between the primary part and the secondary part in the first section can differ from the air gap in the second section. Also, the tooth shape of pole teeth in the first section can be different from the tooth shape of pole teeth in the second section. It is likewise possible to vary the velocity of the linear motor using the parameters of air gap and tooth shape.

A further option for varying the velocity of the linear motor consists in the track width, i.e. the width of the secondary part transversely with respect to the movement direction, being configured differently in the first section than the width of the secondary part in the second section.

A further possibility for influencing the velocity of the linear motor consists in selecting the material of the secondary part in a suitable manner. Thus, for example for low velocities, the secondary part can be solid in the first section and be laminated in the second section for higher velocities.

Braking of the primary part in relation to the secondary part can also take place by means of the secondary part being given a special configuration. Thus, for example, the slots of the secondary part can be open in a first section, while they are filled in a second section by at least one squirrel-cage winding. One or more squirrel-cage windings can advantageously be realized by virtue of the fact that the slots are cast with aluminum and the cast slot sections are correspondingly short-circuited.

BRIEF DESCRIPTION OF THE DRAWING

The present invention will be explained in more detail with reference to the attached drawings, in which:

FIG. 1 shows a basic sketch of a linear motor with different slot widths;

FIG. 2 shows a sketch of a linear motor with different tooth widths;

FIG. 3 shows a sketch of a linear motor with different air gaps;

FIG. 4 shows a sketch of a linear motor with different tooth shapes in the secondary part;

DETAILED DESCRIPTION OF PREFERRED EMBODIMENTS

Figure 5:
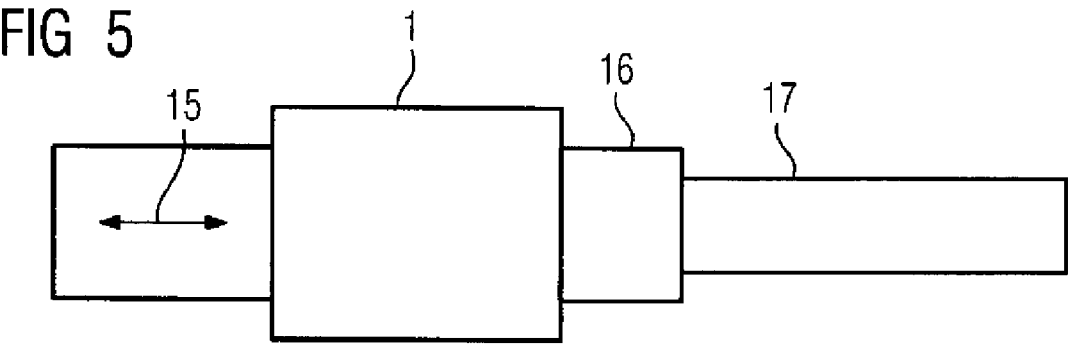
FIG. 5 shows a plan view of a linear motor with secondary part sections of different widths.

The exemplary embodiments outlined in more detail below represent preferred embodiments of the present invention.

The method mentioned at the outset for influencing the power field of a linear motor for example by means of pole-changing has limits as regards the useable power field. The present invention is therefore based on the general concept of altering the useable power field on the basis of location. Specifically, this is intended to take place by means of a locally variable design of the reaction part or secondary part of the linear motor. By using the same primary part with a fixed geometry, fixed pole pitch and fixed electrical connection values, different secondary part sections can be used at different locations of the working range, i.e. at different points on the movement path of the linear motor. As a result of the location-related variation of the geometry and/or the material of the reaction part, the power field of the motor can thus be varied in a desirable manner.

The linear motor illustrated in sketched form in FIG. 1 comprises a primary part 1 and a secondary part 2. The secondary part 2 is in this case split into three secondary part sections 3, 4 and 5. All of the secondary part sections 3 to 5 in this case have the same tooth width of the pole teeth. The slot widths in the movement direction 15 are different in the individual sections, however. Thus, in the example illustrated in FIG. 1, the slot width in the secondary part section 3 approximately corresponds to the tooth width of a pole tooth. In the second secondary part section 4, the slot width is approximately twice as great as in the secondary part section 3. Finally, the slot width between two pole teeth in the secondary part section 5 is approximately four times as great as in the secondary part section 3. Obviously, the slot width in the individual sections can also be selected differently as desired and is not restricted to entire multiples of another section. Likewise, the number of secondary part sections can be selected as desired.

The different slot widths in the secondary part sections 3, 4 and 5 result in different velocities of the primary part 1. Thus, given the same electrical supply of the primary part, a comparatively low velocity is set via the secondary part section 3, a mean velocity is set via the secondary part section 4 and a relatively high velocity is set via the secondary part section 5. The power of the linear motor can therefore be varied locally by virtue of the fact that the slot width is selected correspondingly. The slot widths are equal within each of the secondary part sections 3, 4 and 5.

FIG. 2 shows a second embodiment of a linear motor according to the invention, likewise with a primary part 1 and a secondary part 2. The secondary part 2 is in turn split into three secondary part sections 6, 7 and 8. The first secondary part section 6 has the same configuration as the secondary part section 3 in FIG. 1. The second secondary part section 7, on the other hand, has double the tooth width of that of the first secondary part section 6. The third secondary part section 8 has approximately four times the tooth width of the pole teeth of that of the first secondary part section 6. The pole teeth have equal widths within the secondary part sections.

By varying the tooth width in the individual secondary part sections 6, 7 and 8, in turn in each case a specific velocity via each section results given unchanged electrical driving of the primary part 1. Thus, the velocity of the primary part 1 is relatively low over the secondary part section 6, is at a mean value over the secondary part section 7 and is high over the secondary part section 8.

Also, when varying the tooth widths, one is not restricted to an entire multiple of another secondary part section. Instead, the tooth width in each section can be selected as desired. In addition, the slot width in the individual sections can also be varied. Furthermore, the configuration of the secondary part is not restricted to three secondary part sections, as in the present example, but two, four or more are also possible.

The power of the linear motor depending on the location can also be varied by virtue of the fact that the air gap between the primary part 1 and the secondary part 2 is changed on the movement path. A corresponding example is illustrated schematically in FIG. 3. There is a small air gap 11 between a first secondary part section 9 and the primary part 1. However, there is a larger air gap 12 between the second secondary part section 10 and the primary part 1. This means that the primary part moves at a lower velocity over the first secondary part section 9 than over the second secondary part section 10, given the same driving. The reason for this is the field weakening as a result of the enlarged air gap 12 over the secondary part section 10.

The power of the linear motor can also be varied by the tooth shape of the pole teeth. A corresponding linear motor with a primary part 1 and a secondary part 2 is illustrated in sketch form in FIG. 4. The first secondary part section 13 has the same configuration as the secondary part sections 3, 6 and 9 in FIGS. 1, 2 and 3. The tooth shape in the longitudinal section with respect to the movement direction 15 of the primary part 1 is in this case square or rectangular. In the second secondary part section 14, on the other hand, each tooth has sloping edges. The tooth shapes of the secondary part section 14 symbolically represent any desired change in shape with respect to the tooth shapes of the secondary part section 13.

In this case, too, the different tooth shapes result in different velocities of the primary part 1 over the secondary part sections 13 and 14. Specifically, a low velocity of the primary part 1 results over the secondary part section 13, while, owing to the field weakening, a higher velocity results over the secondary part section 14.

In addition, a variation in the velocity can be achieved by different track widths of the secondary part. In this regard, a linear motor in plan view is sketched in FIG. 5, wherein, in this case too, the primary part 1 can be moved over the secondary part 2 in the movement direction 15. The first secondary part section 16 has a larger track width than the second secondary part section 17. The large track width in the first secondary part section 16 results in a higher inductance of the primary part windings than the second secondary part 17 with a smaller track width. As a result, the primary part 1 can only be moved over the first secondary part section 16 with a lower velocity than over the secondary part section 17. The illustration of individual pole teeth is not included in FIG. 5 for reasons of clarity.

Figure 6:
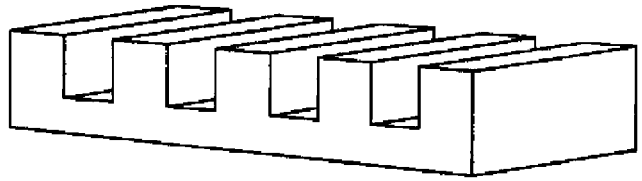
FIG. 6 shows a solid secondary part section.

The velocity of the linear motor can also be influenced by the selection of materials for the secondary part. FIG. 6 shows a secondary part which is solid. Steel, iron, copper, aluminum etc. and alloys thereof are examples of materials. The selected material in turn influences the inductance and therefore the velocity of the primary part.

Figure 7:
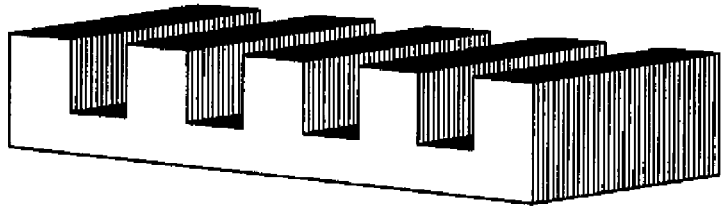
FIG. 7 shows a laminated secondary part section.

In order to reduce losses and increase the velocity, the secondary part can also be laminated, as is illustrated schematically in FIG. 7. According to the invention, for example, laminated and solid secondary part sections are combined with the result that automatically different velocities are set along the movement path. Simply different materials in the secondary part sections can also be used in order to influence the velocity in a desirable manner which is dependent on location.

Figure 8:
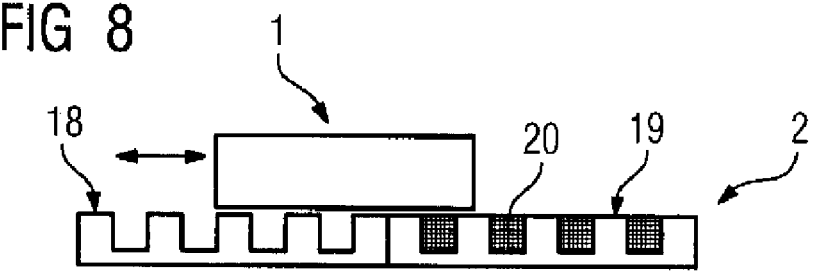
FIG. 8 shows a linear motor with squirrel-cage windings in a section of the secondary part.

A further embodiment of the present invention is reproduced in FIG. 8. In this case, the secondary part is configured in a section such that it can be used for automatic braking. The primary part 1 is in this case capable of being moved over two secondary part sections 18 and 19. The first secondary part section 18 is designed in a conventional manner and corresponds to, for example, the sections 3, 6, 9 and 13 of the preceding embodiments. In the second secondary part section, however, one or more squirrel-cage windings are introduced into the slots between the pole teeth. Thus, the two secondary part sections 18, 19 differ from one another in the broadest sense in terms of their material.

The squirrel-cage windings 20 can be made from aluminum or copper, for example. In particular, it is advantageous if aluminum can be cast into the slots in order to form short-circuiting rings. The short-circuiting rings or squirrel-cage windings 20 can also possibly be configured in switchable fashion. In any case, such a short-circuiting brake is easier to realize in the secondary part 2 than in the primary part 1.

The secondary parts of a linear motor can therefore be configured as desired depending on the location. In certain applications, additional brakes can therefore be dispensed with or the required brakes can be given smaller dimensions. In addition, movement path sections with a drive or motor function and those with a passive braking function can be provided. Such a passive braking function is much preferred for safety reasons since it is provided without any active driving from the outside and achieves a corresponding braking effect merely by means of the force of eddy currents.

Particularly advantageous applications of the invention result for linear motors in which both the electro magnets and the permanent magnets are arranged on the primary part, with the result that a local variation of the secondary part is easily possible. Specifically in the conveying and automation technology sector, linear motors according to the invention can advantageously be used since movement sections with a low and high velocity are often required in this sector. Specific examples of this would be package conveying systems, sorting systems, automated guided vehicle systems, fairground rides etc.

What is claimed is:

1. A linear motor, comprising:
   a primary part; and
   a secondary part operatively connected magnetically to the primary part as the primary part moves over the secondary part in a movement direction, said secondary part being split at least into a first section and a second section in the movement direction of the primary part, wherein the first section of the secondary part has a property which is different from a property of the second section, and wherein the first section of the secondary part is laminated and the second section is solid.

2. The linear motor of claim 1, wherein the first section has a shape which is different than a shape of the second section.

3. The linear motor of claim 1, wherein the first section is made of a material which is different than a material of the second section.

4. The linear motor of claim 1, wherein a slot width between pole teeth in the first section differs from a slot width between pole teeth in the second section.

5. The linear motor of claim 1, wherein a tooth width of pole teeth in the first section differ from a tooth width of pole teeth in the second section.

6. The linear motor of claim 1, wherein an air gap between the primary part and the secondary part in the first section differs from an air gap in the second section.

7. The linear motor of claim 1, wherein a tooth shape of pole teeth in the first section differs from a tooth shape of pole teeth in the second section.

8. The linear motor of claim 1, wherein a width of the secondary part transversely with respect to the movement direction in the first section differs from a width of the secondary part in the second section.

9. The linear motor of claim 1, further comprising at least one squirrel-cage winding introduced into slots of one of the first and second sections of the secondary part.

10. The linear motor of claim 9, wherein the slots are cast with aluminum to form the squirrel-cage winding.

* * * * *

UNITED STATES PATENT AND TRADEMARK OFFICE
CERTIFICATE OF CORRECTION

| | | |
|---|---|---|
| PATENT NO. | : 7,863,782 B2 | Page 1 of 1 |
| APPLICATION NO. | : 12/295066 | |
| DATED | : January 4, 2011 | |
| INVENTOR(S) | : Gerhard Matscheko et al. | |

It is certified that error appears in the above-identified patent and that said Letters Patent is hereby corrected as shown below:

On the Title Page

Item [56] References Cited, FOREIGN PATENT DOCUMENTS, on page 2, replace: "DE 69115918 T2" with -- DE 69116918 T2 --.

Signed and Sealed this
Eighth Day of March, 2011

David J. Kappos
*Director of the United States Patent and Trademark Office*